United States Patent
Miki (10) Patent No.: US 9,904,483 B2
(45) Date of Patent: Feb. 27, 2018

(54) FILE MANAGEMENT DEVICE, PROGRAM AND FILE MANAGEMENT METHOD

(71) Applicant: Fixstars Corporation, Tokyo (JP)

(72) Inventor: Satoshi Miki, Tokyo (JP)

(73) Assignee: FIXSTARS CORPORATION, Tokyo (JP)

( * ) Notice: Subject to any disclaimer, the term of this patent is extended or adjusted under 35 U.S.C. 154(b) by 136 days.

(21) Appl. No.: 14/916,274

(22) PCT Filed: Aug. 19, 2014

(86) PCT No.: PCT/JP2014/071625
§ 371 (c)(1),
(2) Date: Aug. 5, 2016

(87) PCT Pub. No.: WO2015/033767
PCT Pub. Date: Mar. 12, 2015

(65) Prior Publication Data
US 2016/0335010 A1    Nov. 17, 2016

(30) Foreign Application Priority Data

Sep. 4, 2013 (JP) ................................. 2013-183005

(51) Int. Cl.
*G06F 12/00* (2006.01)
*G06F 3/06* (2006.01)
(Continued)

(52) U.S. Cl.
CPC .......... *G06F 3/0619* (2013.01); *G06F 3/0608* (2013.01); *G06F 3/0643* (2013.01); *G06F 3/0655* (2013.01); *G06F 3/0679* (2013.01); *G06F 3/0688* (2013.01); *G06F 12/0238* (2013.01); *G06F 12/0638* (2013.01); *G06F 2212/1044* (2013.01); *G06F 2212/7201* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 5,787,493 A | 7/1998 | Niijima et al. | |
| 2014/0176976 A1* | 6/2014 | Tsukahara | G03G 15/5004 358/1.13 |

FOREIGN PATENT DOCUMENTS

| | | |
|---|---|---|
| JP | 6-131266 | 5/1994 |
| JP | 2004-362464 | 12/2004 |

OTHER PUBLICATIONS

NPD_Kiso kara Wakaru!, PC Nyumon/Sainyumon, online, searched on Aug. 28, 2013, Internet, URL: http://yamajo.net/knowledge/structure/structure_03.html.

* cited by examiner

*Primary Examiner* — John A Lane
(74) *Attorney, Agent, or Firm* — MKG LLC (57) ABSTRACT

A processing unit processes data stored in a processing region. A processing region is a region in a storage region, used by processing unit for processing. A management unit manages file data stored as a file in storage device. Management unit associates an address of a storage region of storage device in which file data is stored with the file name of file data thereof. When processing unit processes file data, management unit assigns an address that is associated with the file name of the file data and stored as an address representing a processing region.

10 Claims, 6 Drawing Sheets

| FILE NAMES | ADDRESSES |
|---|---|
| AAA.aaa | ADDRESS 1 |
| BBB.bbb | ADDRESS 2 |
| CCC.ccc | ADDRESS 3 |
| ... | ... |

| PROCESS IDs | ADDRESSES |
|---|---|
| P001 | ADDRESS 4 |
| P002 | ADDRESS 5 |
| P003 | ADDRESS 6 |
| ... | ... |

(51) Int. Cl.
*G06F 12/02* (2006.01)
*G06F 12/06* (2006.01)

| FILE NAMES | ADDRESSES |
|---|---|
| AAA.aaa | ADDRESS 1 |
| BBB.bbb | ADDRESS 2 |
| CCC.ccc | ADDRESS 3 |
| ... | ... |

FIG. 3

| PROCESS IDs | ADDRESSES |
|---|---|
| P001 | ADDRESS 4 |
| P002 | ADDRESS 5 |
| P003 | ADDRESS 6 |
| . . . | . . . |

| FILE NAMES | ADDRESSES | MODIFICATION PERMISSION |
|---|---|---|
| AAA.aaa | ADDRESS 1 | X |
| BBB.bbb | ADDRESS 2 | O |
| CCC.ccc | ADDRESS 3 | O |
| ... | ... | ... |

FILE MANAGEMENT DEVICE, PROGRAM AND FILE MANAGEMENT METHOD

The present invention pertains to a technique for managing files.

BACKGROUND

There are known in the art techniques for managing files. For example, when data stored as a file in an auxiliary storage is to be used in a process executed on a computer, the data stored as a file in the auxiliary storage device is read by a main storage device. When a read operation of the data has been completed by the main storage device, the data is written to the auxiliary storage device at a predetermined timing such as at the end of processing. Data that has been read by the main storage device and processed is written as a file in the auxiliary storage device at a determined timing such as at the end of processing. For example, such a technique is disclosed in non-patent document 1[1].

[1] Yamanjo, "Kiso kara Wakaru! PC Nyumon/Sainyumon", online, searched on 28 Aug. 2013, Internet, <URL:http://yamanjo.net/knowledge/structure/structure_03.html>

When reading and writing of data are performed as described above, two identical items of data, namely, data stored in an auxiliary storage device and data read by a main storage device, exist simultaneously during a period of time in which the data is being used in processing, for example. This causes a reduction in free space in a storage region of an entire storage device in which these items of data, that is, data stored as a file and data stored in a region for executing processing (for example, a storage region in a main storage device that is secured for processing) are stored.

SUMMARY

The present invention was achieved in view of the background described above, and the purpose of the present invention is to increase an amount of free space in a storage region of a storage device that stores data as files and stores data in regions for executing processing.

To solve the above-described problem, the present invention provides, as one mode, a file management device comprising a management unit that manages data stored as a file in a storage device, the management unit associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.

When data processed by the processing unit in the processing region is stored as a file, the management unit may associate the address of the data within the processing region with a file name and stores the data.

The present invention provides, as another mode, a file management device comprising a management unit that manages data stored as a file in a storage device, wherein, when data stored within a processing region in a storage region of the storage device used by a processing unit that processes data during the processing is stored as a file, the management unit associates the address of the data within the processing region with a file name and stores the data.

When permission is not given to modify data to be processed by the processing unit, the management unit may generate duplicate data, which is a duplicate of the data to be processed, and assign the address of the duplicate data or the data to be processed as an address that represents the processing region. Further, the storage device may have a non-volatile storage medium. The management unit and the processing unit may be functional components realized by a processor, and the processor may access data stored in the storage unit without going through another processor.

The present invention provides, as another mode, a program for causing a computer to function as a management unit that manages data stored as a file in a storage device, the management unit associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.

The present invention provides, as another mode, a program for causing a computer to function as a management unit that manages data stored as a file in a storage device, wherein, when data stored within a processing region in a storage region of the storage device used by a processing unit that processes data during the processing is stored as a file, the management unit associates the address of the data within the processing region with a file name and stores the data.

The present invention provides, as another mode, a file management method comprising a management step for managing data stored as a file in a storage device, the management step associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.

The present invention provides, as another mode, a file management method comprising a management step for managing data stored as a file in a storage device, wherein, when data stored within a processing region in a storage region of the storage device used by a processing unit that processes data during the processing is stored as a file, the management step associates the address of the data within the processing region with a file name and stores the data.

According to the present invention, the free space can be increased in a storage region in a storage device that stores data as a file and stores data to be processed in a region for processing.

DETAILED DESCRIPTION

[Configuration of Embodiment]

Figure 1:
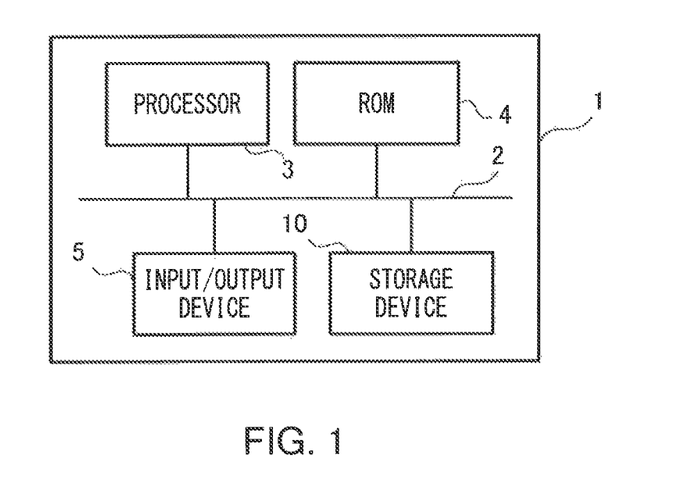
FIG. 1 is a block diagram illustrating the hardware configuration of a file management device.

The following is an explanation of a file management device 1 according to one embodiment of the present invention, with reference to the figures. FIG. 1 is a block diagram illustrating the hardware configuration of file management device 1.

File management device 1 is a computer provided with a bus 2, a processor 3, a ROM (Read Only Memory) 4, an input/output device 5 and a storage device 10. Bus 2 mediates receiving/delivering data between each of the other components.

Processor 3 is, for example, a CPU (Central Processing Unit), which processes data and controls each part of file management device 1 by executing a program stored in ROM 4 or storage device 10. Programs executed by processor 3 include so-called OS (Operating System) programs and various application programs. ROM 4 is a storage medium dedicated to reading data, and specific data is stored therein during production.

Input/output device 5 delivers input data to processor 3, outputs data delivered from processor 3, and the like. Input/output device 5 is provided with a keyboard, mouse, touch screen and the like, for example, by which data is input in accordance with an operation performed by a user. Input/output device 5 is provided with a display unit, sound output unit and the like, for example, and converts data into images or sound and outputs the data. Input/output device 5 is provided with a circuit or the like for performing communication with external devices, for example, and inputs/outputs data to/from external devices.

Storage device 10 is a device for storing data, and both reading and writing of data are executed by processor 3. Storage device 10, in the present embodiment, is provided with a so-called non-volatile storage medium that continues to store data even when power is no longer supplied thereto. A non-volatile storage medium is a NAND flash memory, a NOR flash memory, an MRAM (Magnetoresistive Random Access Memory), an STT (Spin Torque Transfer)-RAM or the like, for example. Since such a non-volatile storage medium is provided, even if, for example, the power supply to file management device 1 is cut and storage device 10 is no longer supplied with power, data stored in storage device 10 continues to be stored. In storage device 10, writing is executed in bytes or words (units of data that can be processed at once by processor 3) unit, and deletion of data is executed using a storage region known as a block as a unit (the size is approximately from 4K to 256 KB).

Storage device 10 is directly connected to processor 3 via bus 2, and therefore does not have a processor for controlling reading/writing of data, that is, accessing data. Therefore, processor 3 directly accesses data stored in storage device 10 without going through another processor. Accordingly, compared to a case whereby processor 3 accesses a storage device via a processor, the time required for processing by another processor is not required, whereby the time required to access data is shortened.

[Outline of the Embodiment]

Figure 2:
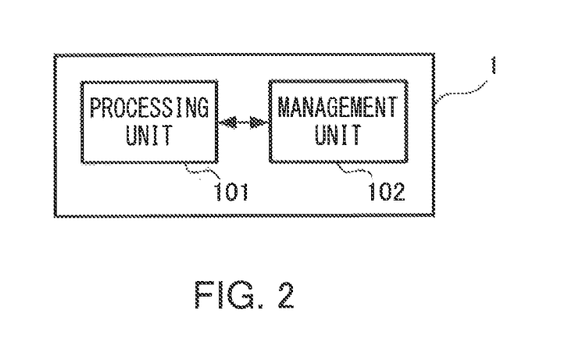
FIG. 2 is a block diagram illustrating the functional configuration of a file management device.

In file management device 1, by processor 3 executing each of the aforementioned programs and controlling each part, the following functions related to file management processes that manage data stored as files are realized. Here, 'file' signifies data that can be accessed using a file name. FIG. 2 is a block diagram illustrating the functional configuration of file management device 1. File management device 1 is provided with a processing unit 101 and a management unit 102.

Processing unit 101 is one example of a unit that processes data. Processing carried out by a processing unit is, for example, data reference, data modification, data integration and data distribution. Processing unit 101, as described above, is a functional component that is realized when a program is executed, and is realized for each execution unit of a program, known as a process, for example. When processing unit 101 is realized, a part of the storage region of storage device 10 becomes assigned as a region to be used for data processing. Hereafter, a region assigned as such, that is, a region within a storage region used by processing unit 101 for processing is referred to as a "processing region." A processing region has assigned to it the block described above as a unit, for example.

Processing unit 101 stores, in a processing region, an operation code or variable of a program, data to be processed, and the like, and processes data using the stored data. For example, a processing unit 101 that is realized by execution of an application program for document creation performs a process of storing document data indicating a new document in a processing region in accordance with an operation performed by a user, and then performs a process of modifying a document indicating the stored document data. Data processed as such is sometimes also used after a program that was previously actualising processing unit 101 has ended, and such data is stored by management unit 102 as a file.

Management unit 102 is one example of a unit that manages data stored in storage device 10 as a file (hereafter referred to as "file data"). Management unit 102 stores a file management table in which the file name of file data and the address to which that file data is stored are associated and stored. Here, 'address' is information for identifying each location in a storage region of storage device 10, and in the present embodiment, is represented by a block identifier that identifies the blocks described above. Management unit 102 stores a file management table in a storage device, for example, and updates the file management table each time there is a change to the contents thereof.

Figure 3:
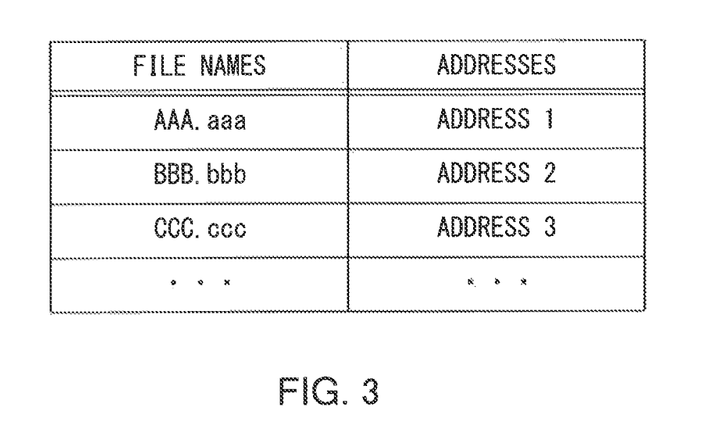
FIG. 3 is a drawing illustrating one example of a stored file management table.

FIG. 3 is a drawing illustrating one example of a stored file management table. In this example, file names "AAA.aaa," "BBB.bbb," and "CCC.ccc" are associated with "address 1," "address 2," and "address 3," respectively. These addresses are actually represented by one or more block identifiers. As such, management unit 102 associates an address of file data stored in a storage region of storage device 10 with the file name of that file data, and stores the address.

Management unit 102 assigns an address with which the file name of the file data thereof is associated and stored, as an address representing a region used by processing unit 101 for processing within a storage region, when processing unit processes file data. Specifically, firstly, processing unit 101, when processing file data, notifies management unit 102 of the file name of the file data, which is to be processed. Management unit 102 determines that the file data with the file name notified from processing unit 101 is to be processed, and assigns an address associated with the file name in a file management table as an address representing a processing region.

Figure 4:
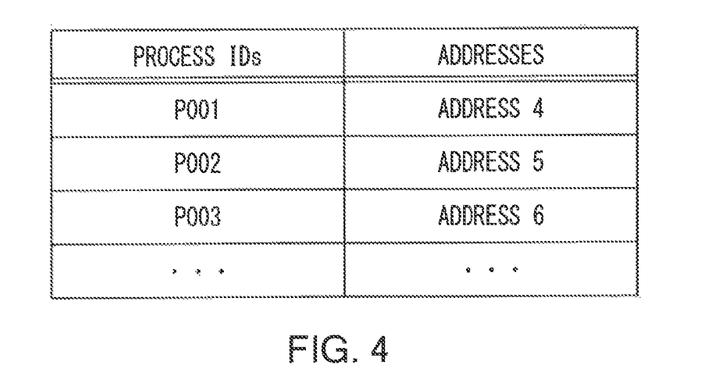
FIG. 4 is a drawing illustrating one example of a processing region table.

A processing region is managed by a processing region table in which a process ID that identifies a process is associated with an address representing a processing region assigned to that process, for example. FIG. 4 is a drawing illustrating one example of a processing region table. In this example, process IDs "P001," "P002," and "P003" are associated with addresses "address 4," "address 5," and "address 6," respectively. These addresses, similarly to those shown in FIG. 3, are represented by one or more block identifiers.

A processing region table may be generated by management unit 102, or by another unit (for example, a functional component of the OS). Management unit 102 performs the above-described assignment by adding an address that is associated with the file name to an address that is associated with the process ID of processing unit 101 in a processing region table. For example, in a case where a process ID "P002" of processing unit 101 and a file name "AAA.aaa" of processing unit 101 are notified, management unit 102 performs the assignment by adding a block identifier represented by "address 1" that is associated with file name "AAA.aaa" in the file management table illustrated in FIG. 3 to a block identifier represented by "address 5" that is associated with "P002" in a processing region table. The following is a more specific example of this assignment, with reference to FIG. 5A-5D (hereafter collectively referred to as "FIG. 5").

FIG. 5 is a drawing illustrating a specific example of address assignment performed by management unit 102. FIG. 5 illustrates a storage device 10 having N blocks, 11-1, 11-2, . . . , 11-N. In FIG. 1A the file name data AAA.aaa that is stored in address 1 (in this example, block identifiers 11-*a*, 11-*b*) is illustrated by hatching.

Figure 5A:
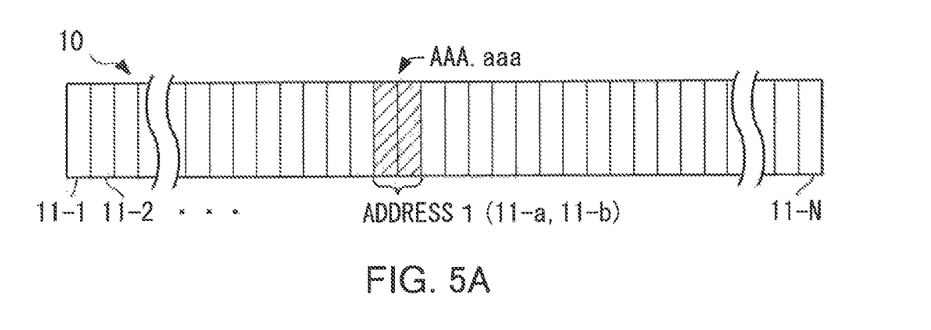
FIG. 5A is a drawing illustrating a specific example of assignment of address performed by a management unit.
Figure 5B:
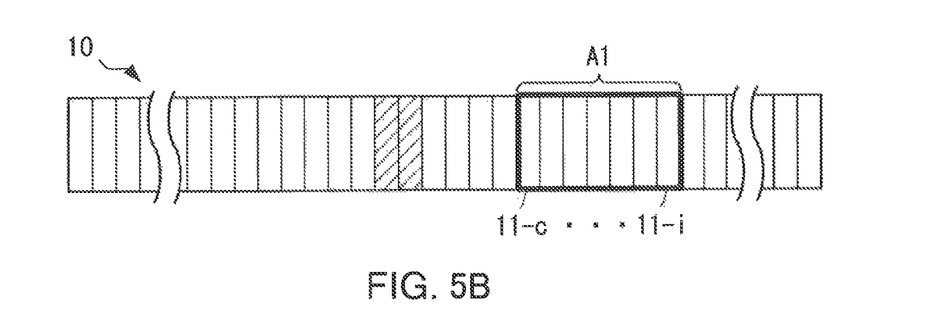
FIG. 5B is a drawing illustrating a specific example of assignment of an address performed by a management unit.

FIG. 5B illustrates processing region A1 that is assigned when a program is executed and processing unit 101 is realized. Processing regions shown in the figures are surrounded by a thick line for ease of recognition. In this example, a processing region A1 represented by seven block identifiers from 11-c to 11-i is illustrated. In processing region A1, an operation code or variable executed by processing unit 101 is read from ROM 4, for example, and stored.

Figure 5C:
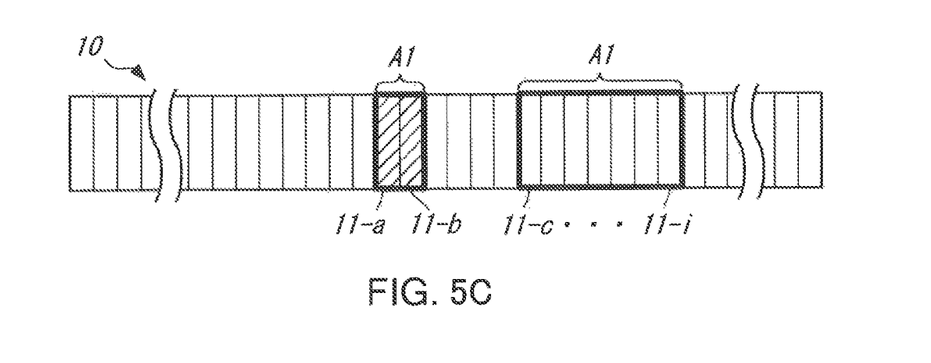
FIG. 5C is a drawing illustrating a specific example of assignment of an address performed by a management unit.

For example, if, due to an operation performed by a user, processing unit 101 processes file data with the file name "AAA.aaa," management unit 102 assigns address 1 as a processing region. As a result, as illustrated in FIG. 5C, a region represented by block identifiers 11-a and 11-b is included in processing region A1 in addition to a region represented by block identifiers 11-c to 11-i.

Figure 5D:
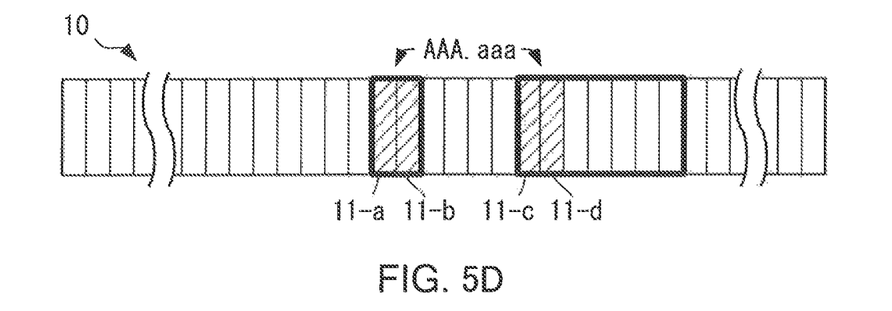
FIG. 5D is a drawing illustrating a specific example of assignment of an address performed by a management unit.

If processing unit 101 processes file data that has been determined to be stored in processing region A1, the result of the processing is reflected immediately. For example, if, as a result of processing unit 101 processing the file data, the data size increases and no longer fits in address 1, as illustrated in FIG. 5D, the file data is stored across other blocks within processing region A1. In this example, file data with the file name "AAA.aaa" no longer fits in the blocks with block identifiers 11-a and 11-b, and is stored across blocks 11-c and 11-d. As described above, in file management device 1, file data is processed directly, and the contents of the file data are modified in accordance with the details of the processing.

If data processed in a processing region by processing unit 101 is stored as a file, management unit 102 associates the address of the data within the processing region with a file name and stores the data. If the file name is not stored in a file management table, management unit 102 stores the file name and address by newly storing the file name and address in a file management table. If the file name is already stored in a file management table, management unit 102 stores the address associated with the file name by updating the address to a new address. The following is an example in which a file management table is updated by management unit 102 with reference to FIGS. 6A and 6B (hereafter collectively referred to as "FIG. 6").

Figure 6A:
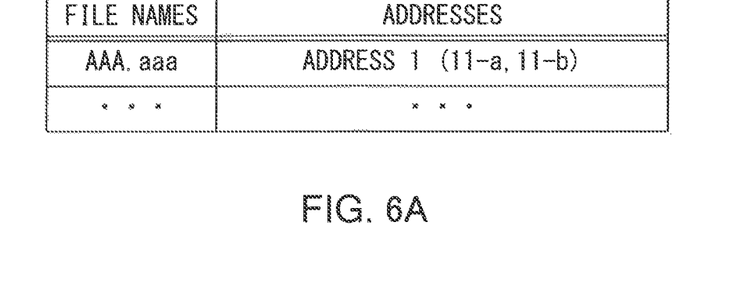
FIG. 6A is a drawing illustrating an example of a file management table updated by a management unit.
Figure 6B:
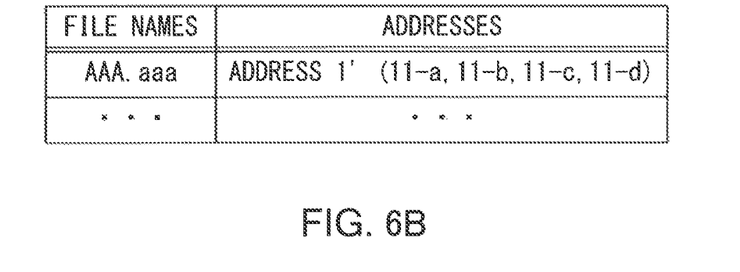
FIG. 6B is a drawing illustrating an example of a file management table updated by a management unit.

FIG. 6 is a drawing illustrating an example of a file management table that is updated by management unit 102. FIG. 6A illustrates address 1 with block identifiers 11-a and 11-b illustrated in FIG. 5A. Thereafter, if file data with the file name "AAA.aaa" illustrated in FIG. 5D is stored as a file, management unit 102 updates address 1 to address 1', which is 11-a, 11-b, 11-c and 11-d as illustrated in FIG. 6B. When a program that was actualising processing unit 101 ends, processing region A1 illustrated in FIG. 5 is freed, but since the file name of file data "AAA.aaa" is associated with address 1', the file data continues to be stored as data that is accessible using the file name, that is, as a file.

[Operation of the Embodiment]

Figure 7:
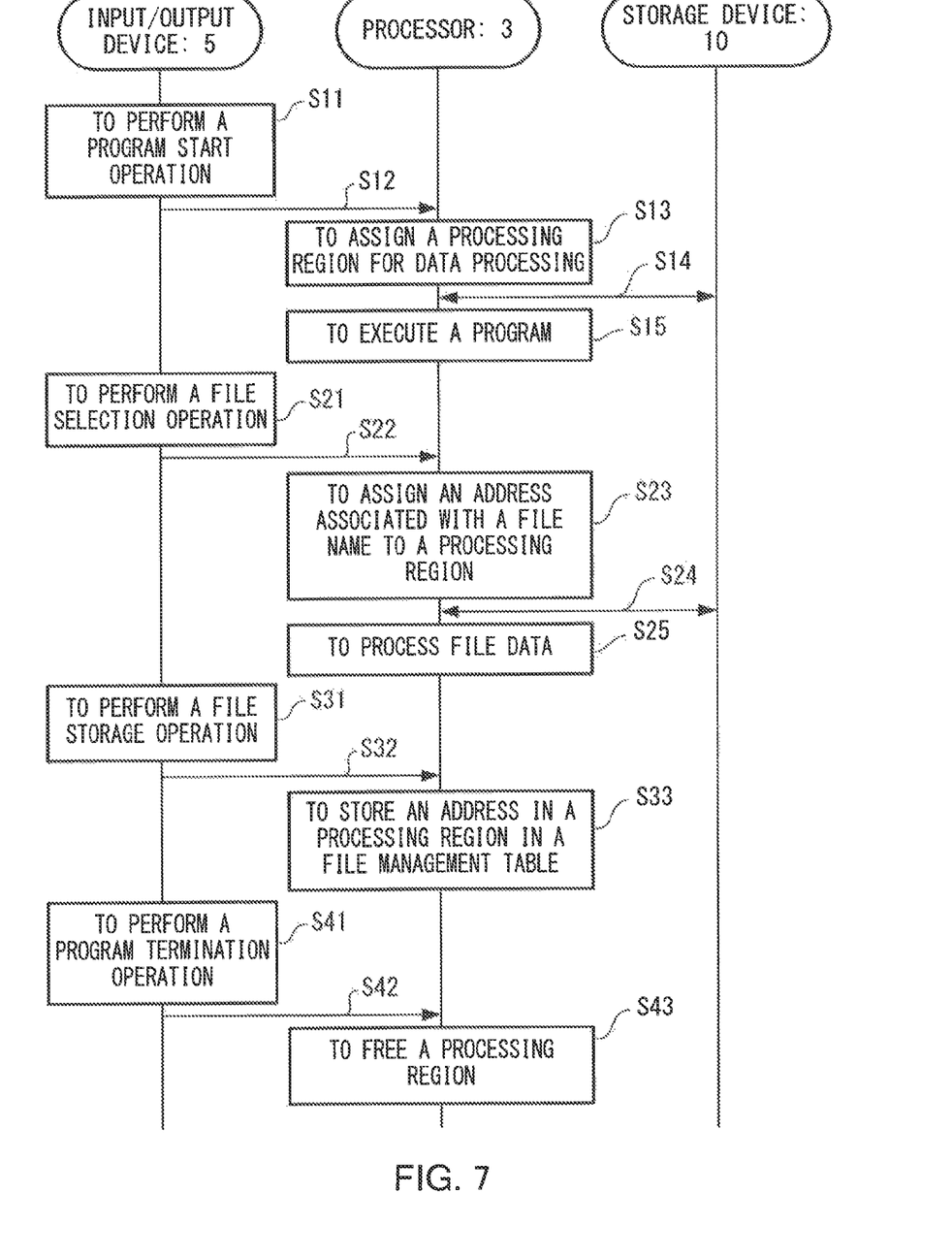
FIG. 7 is a sequence diagram illustrating one example of the operation of each part of a file management process.

The following is an explanation of one example of the operation of file management processing with reference to the sequence diagram shown in FIG. 7. FIG. 7 is a sequence diagram illustrating one example of the operation of each part of file management processing. The operation illustrated in FIG. 7 is such that, in file management device 1, start-up of a program is triggered by a user performing a program start operation, for starting the program, in input/output device 5 (step S11). Input/output device 5 supplies processor 3 with operation data indicating a program start operation (step S12). When operation data is supplied, processor 3 assigns a processing region used for processing related to a program to be executed (step S13)

One example of a processing region thus assigned is processing region A1 illustrated in FIG. 5B. Next, processor 3 stores an operation code, variable and the like in the assigned processing region (step S14), and executes a program (step S15). Steps S13, S14, and S15 are operations performed by processing unit 101.

Next, a user performs, in input/output device 5, a file selection operation for selecting a file stored in storage device 10 (step S21). If the application program for document creation described above is being executed, file selection operation is an operation that selects and opens a document file. Next, input/output device 5 supplies processor 3 with operation data that indicates a file selection operation (step S22). This operation data is data indicating the file name of a selected file. Processor 3 assigns an address, which is associated with a file name indicated by the supplied operation data and stored, as a processing region (step S23). One example of a processing region thus assigned is processing region A1 illustrated in FIG. 5C and 5D. Step S23 is an operation performed by management unit 102.

Next, processor 3 uses data (operation code and variable, file data, and the like) stored in an assigned processing region (step S24) to process file data (step S25). One example of file data thus processed is data with the file name "AAA.aaa" illustrated in FIG. 5D. Steps S24 and S25 are operations performed by processing unit 101.

Next, if a user performs a file storage operation for storing processed data as a file (step S31), input/output device 5 supplies processor 3 with operation data indicating file storage operation (step S32). Processor 3 stores, in a file management table, an address in a processing region in which data processed in step S25 is stored (step S33). One example of an address thus stored is address 1' illustrated in FIG. 6B.

Step S33 is an operation performed by management unit 102.

If a user performs a program termination operation that ends a program (step S41), input/output device 5 supplies processor 3 with operation data indicating a program termination operation (step S42), and processor 3 ends the program and frees a processing region (step S43). Even after a program is terminated in this way, storage device 10 stores processed data as a file.

[Effects of the Embodiment]

According to conventional technology, a configuration in which a file management device is provided with a main storage unit and an auxiliary storage unit is common. By this configuration, a processor stores file data in an auxiliary storage device, and when processing the file data, stores a duplicate of the file data before processing the duplicate. By such a conventional configuration, in addition to a storage region in an auxiliary storage device for storing file data, a storage region of the same size for storing a duplicate of the file data is required in a main storage device. According to the present embodiment, since file data stored in storage device 10 is processed directly by processing unit 101, it is sufficient for storage device 10 to have one storage region of sufficient size to store the file data (11-a and 11-b in the situation illustrated in FIG. 5A-5C, 11-a, 11-b, 11-c and 11-d in the situation illustrated in FIG. 5D). In other words, in the present embodiment, a duplicate of the file data is not generated when file data is processed. As such, according to the present embodiment, free space can be increased in a storage region of a storage device as compared to a case where the addresses of file data are not assigned as processing regions.

In the conventional configuration described above, when processed data is stored as a file in a main storage device, a duplicate of the processed data is stored in an auxiliary storage device. In this case, a storage region for storing processed data is also required in both the main storage device and the auxiliary storage device. In the present embodiment, since data processed by processing unit 101 is stored as a file as is, a duplicate of the processed data is not generated, similarly to when file data is processed. As such, according to the present embodiment, free space can be increased in a storage region of a storage device as compared to a case where the addresses of data within a processing region are not associated with file names and are stored.

The conventional configuration described above requires a duplicate of file data or processed data to be generated both when file data is processed and when processed data is stored as a file. The present embodiment does not require a process of generating such duplicates, and is capable of reducing the load or processing by a processor or the load of data transfer by a bus as compared to a case where such duplicates are generated. Further, since no time is required for the process of generating duplicates, processing speed can be increased as compared to a case where duplicates are generated.

MODIFIED EXAMPLE

The embodiment described above may be modified as follows. The embodiment described above may be combined with one or more of the following modified examples.

Modified Example 1

In the embodiment described above, when contents of file data is modified by being processed by processing unit 101, file data whose contents are modified was stored as a file as is. In other words, a file was overwritten. However, some types of file data do not permit modification. These are, for example, file data that is protected so as not to be editable, file data that is being edited by another user and is exclusively controlled, and the like. In the present modified example, explained is an example in which such file data is not modified.

Figure 8:
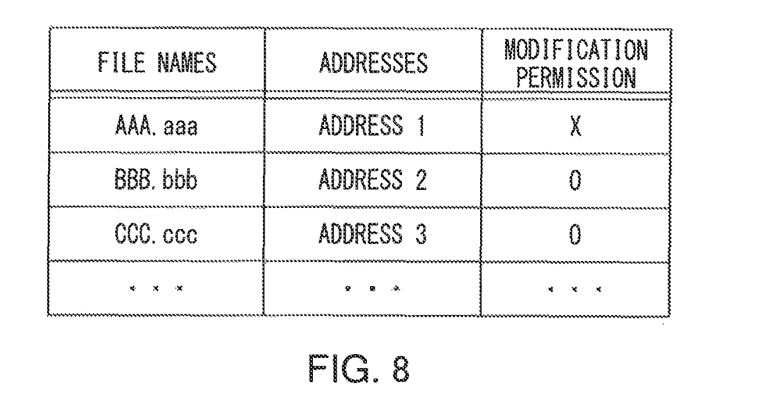
FIG. 8 is a drawing illustrating one example of a file management table of a modified example.

If modification of processing data processed by processing unit 101 is not permitted, management unit 102 generates duplicate data that is a duplicate of the processing data, and assigns the address of the duplicate data or processing data as an address representing the processing region. Management unit 102 stores a file management table that stores a flag indicating whether or not data modification is permitted, for example. FIG. 8 is a drawing illustrating one example of a file management table of the present modified example. In this example, the file names "AAA.aaa," "BBB.bbb," and "CCC.ccc" are associated with modification permission flags "X," "O," "O" respectively. The flag "O" indicates that modification is permitted, and the flag "X" indicates that modification is not permitted.

When the file name of file data to be processed by processing unit 101 is supplied, management unit 102 refers to a file management table, and if the flag associated with the file name is "O," indicates that modification is permitted, and assigns an address as described in the embodiment. If the flag is "X," management unit 102 determines that modification is not permitted, generates duplicate data of the file data and stores the data in storage device 10. Management unit 102 assigns the address of the stored duplicate data as an address representing a processing region, for example.

FIG. 9A-9D (hereafter collectively referred to as "FIG. 9") are drawings illustrating specific examples of assigning of addresses performed by management unit 102. FIG. 9 illustrates each block of storage device 10 similarly to FIG. 5.

Figure 9A:
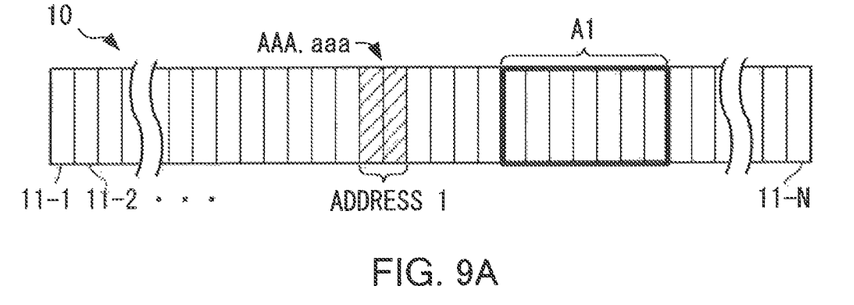
FIG. 9A is a drawing illustrating a specific example of assignment of an address performed by a management unit.
Figure 9B:
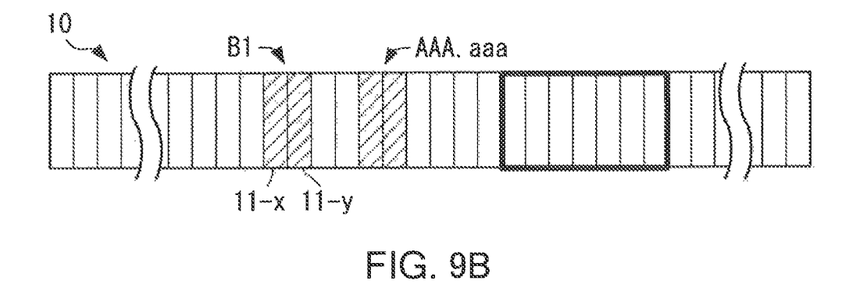
FIG. 9B is a drawing illustrating a specific example of assignment of an address performed by a management unit.

FIG. 9A illustrates a situation in which data of the file name "AAA.aaa" is stored in address 1 and processing region A1 is assigned, as in FIG. 5B. In this example, since the flag of the file data of "AAA.aaa" to be processed is "X," management unit 102 stores duplicate data B1 of the file data in a block with the identifiers 11-$x$ and 11-$y$, as illustrated in FIG. 9B.

Figure 9C:
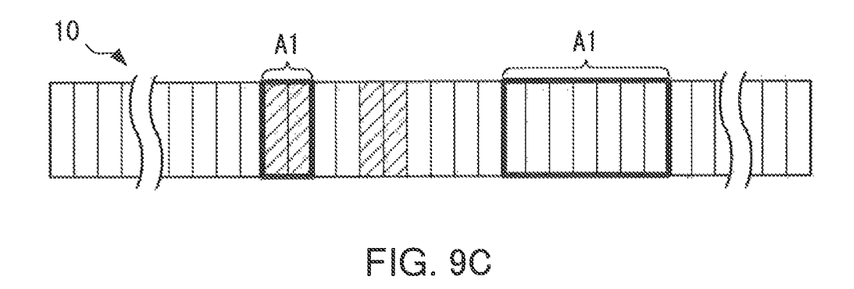
FIG. 9C is a drawing illustrating a specific example of assignment of an address performed by a management unit.
Figure 9D:
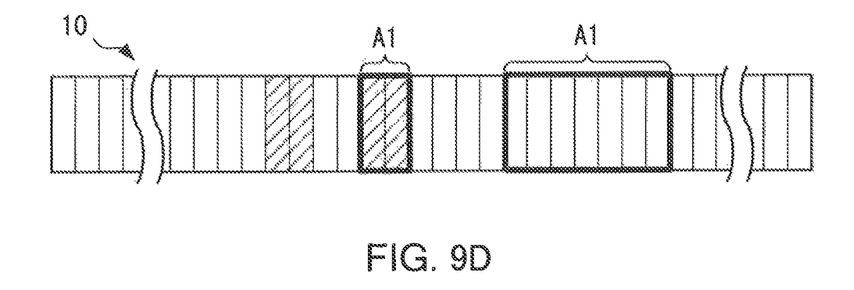
FIG. 9D is a drawing illustrating a specific example of assignment of an address performed by a management unit.

Management unit 102 assigns the address of duplicate data B1 as an address representing processing region A1, for example, as illustrated in FIG. 9C. Management unit 102 may also assign the address of "AAA.aaa," which is the duplicate source, as an address representing processing region A1, as illustrated in FIG. 9D. In the latter case, management unit 102 updates an address associated with the file name "AAA.aaa" of a file management table to the address of the duplicate data (11-x and 11-y in this example). In either case, even if data is modified by the processing executed by processing unit 101, either the file data or the duplicate data remains without being modified. According to the present modified example, if data for which modification is not permitted is processed, the data can remain in its non-modified state.

Modified Example 2

The storage device is a non-volatile storage medium in the embodiment described above, but is not limited thereto. Even when the storage device is a volatile storage medium, if, for example, the file management device is a device that continues working 24 hours a day and 365 days a year such as a mainframe, power supply to the storage device is never terminated, and therefore data stored in the storage device can continue to be stored as a file.

Modified Example 3

The storage device is a device connected to bus 2 similarly to processor 3 in the embodiment described above, but is not limited thereto. The storage device may be connected via input/output device 5, and may also be connected to a circuit connected to input/output device 5, for example. That is, the storage device may be provided within a file management device or outside a file management device. The storage device is a device that does not have a processor for controlling data access in the embodiment described above, but is not limited thereto. The storage device may be a so-called hard disk drive in which access is controlled by a controller having a processor, for example. Even in such cases, similarly to the embodiment, since duplicates of file data or processed data are not generated, the feature of being able to increase the free space of the storage region in a storage device or the feature of reducing the load on the processing by the processor or the load of data transfer is unchanged.

Modified Example 4

The processing unit may be a functional component that is realized by an external device other than a file management device. For example, a file management device and an external device may share a storage device, and the file management device may execute the file management processing described above also to realize a processing unit in the external device. In such a case, the external device is provided with a connection device for connecting with a processor, ROM and file management device, for example, and the processor realizes the processing unit by executing a program stored in the ROM. Management unit 102 communicates the address assigned to the processing unit via bus 2, connecting part and the like, receives the file name of file data to be processed, and the like. In other words, the processing unit needs to be able to exchange this information with management unit 102.

Modified Example 5

In the embodiment described above, the management unit performs both a process of assigning an address representing a processing region (hereafter referred to as "assigning process") and a process of associating the address of processed data with a file name (hereafter referred to as "association process"), but the management unit may perform only one of these processes. For example, when storing data processed in a processing region for which an assignment process has been executed as a file, as long as the data has been moved to another address, the address of the destination after moving and the file name can be associated and stored. In this case, the storage capacity required for storing processed data is also that of one item of data at any point. Therefore, free space can be increased in the storage region of a storage device compared to when duplicates of processed data are generated as in the conventional configuration described above.

When processing is executed on file data stored as a file after the association process has been performed, as long as the file data has been moved to another address, the address of the destination after moving may be assigned as an address representing a processing region. In this case, the storage capacity required for storing processed data is also that of one item of data at any point, and free space can be increased in the storage region of a storage device, as compared to a conventional configuration.

Further, in place of moving file data or processed data as described above, duplicates of the data may be generated. In this case, data is duplicated momentarily, but a non-duplicated state is maintained until the duplicates are generated, and free space in the storage region of a storage device can be increased compared to a conventional configuration.

Modified Example 6

The present invention, in addition to a file management device, can be used as a file management method for actualising processes executed by a file management device. Here, a process is the file management processing illustrated in FIG. 7. The present invention can also be used as a program for causing a computer such as a file management device to function as the unit illustrated in FIG. 2. This program may be provided in a mode of a recording medium that stores the program, such as an optical disk, provided in a mode of being downloaded to a computer via a network such as the Internet and the program being installed to be made usable, and the like.

EXPLANATION OF THE REFERENCE NUMERALS

1 . . . file management device, 2 . . . bus, 3 . . . Processor, 4 . . . ROM, 5 . . . input/output device, 10 . . . storage device, 101 . . . processing unit, 102 . . . management unit

The invention claimed is:
1. A file management device comprising:
a management unit that manages data stored as a file in a storage device, the management unit associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.
2. The file management device according to claim 1, wherein,
when data processed by the processing unit in the processing region is stored as a file, the management unit associates the address of the data within the processing region with a file name and stores the data.

3. The file management device according to claim 1, wherein,
when permission is not given to modify data to be processed by the processing unit, the management unit generates duplicate data, which is a duplicate of the data to be processed, and assigns the address of the duplicate data or the data to be processed as an address that represents the processing region.

4. The file management device according to claim 1, wherein
the storage device is provided with a non-volatile storage medium.

5. The file management device according to claim 1, wherein
the management unit and processing unit are functional components that are realized by a processor, the processor accessing data stored in the storage device without going through another processor.

6. A file management device comprising:
a management unit that manages data stored as a file in a storage device, wherein, when data stored within a processing region in a storage region of the storage device used by a processing unit that processes data during the processing is stored as a file, the management unit associates the address of the data within the processing region with a file name and stores the data.

7. A program stored on a non-transitory computer readable medium for causing a computer to function as:
a management unit that manages data stored as a file in a storage device, the management unit associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.

8. A program stored on a non-transitory computer readable medium for causing a computer to function as:
a management unit that manages data stored as a file in a storage device, wherein, when data stored within a processing region in a storage region of the storage device used by a processing unit that processes data during the processing is stored as a file, the management unit associates the address of the data within the processing region with a file name and stores the data.

9. A file management method comprising:
a management step for managing data stored as a file in a storage device, the management step associating a file name of the data and an address of the data in a storage region of the storage device and storing the associated data, and when a processing unit that processes data processes data stored as a file, assigning an address in which a processing region used by the processing unit during the processing within the storage region is associated with the file name of the data as an address and stored.

10. A file management method comprising:
a management step for managing data stored as a file in a storage device, wherein, when data stored within a processing region in a storage region of the storage device used by a processing unit that processes data during the processing is stored as a file, the management step associates the address of the data within the processing region with a file name and stores the data.

* * * * *